(12) United States Patent
Barbir et al.

(10) Patent No.: US 12,003,643 B2
(45) Date of Patent: Jun. 4, 2024

(54) SYSTEMS AND METHODS FOR VERIFYING OR ENSURING COMMUNICATION PATHS

(71) Applicant: Aetna Inc., Hartford, CT (US)

(72) Inventors: Abbie Barbir, Hartford, CT (US); John Poirier, Hartford, CT (US); Alan Bachmann, Hartford, CT (US); Amy Ulrich, Hartford, CT (US); Cisa Kurian, Hartford, CT (US); Erick Verry, Hartford, CT (US)

(73) Assignee: Aetna Inc., Hartford, CT (US)

( * ) Notice: Subject to any disclaimer, the term of this patent is extended or adjusted under 35 U.S.C. 154(b) by 297 days.

(21) Appl. No.: 17/680,142

(22) Filed: Feb. 24, 2022

(65) Prior Publication Data
US 2022/0278846 A1    Sep. 1, 2022

Related U.S. Application Data

(60) Provisional application No. 63/154,484, filed on Feb. 26, 2021.

(51) Int. Cl.
| | |
|---|---|
| *H04L 9/32* | (2006.01) |
| *G06K 19/06* | (2006.01) |
| *H04L 9/00* | (2022.01) |
| *H04L 9/40* | (2022.01) |
| *H04L 67/146* | (2022.01) |
| *H04W 12/77* | (2021.01) |

(52) U.S. Cl.
CPC ...... *H04L 9/3228* (2013.01); *G06K 19/06056* (2013.01); *H04L 67/146* (2013.01); *H04L 9/50* (2022.05)

(58) Field of Classification Search
CPC ....... H04L 9/3228; H04L 67/146; H04L 9/50; H04L 63/12; H04L 63/1483; G06K 19/06056; H04W 12/77
See application file for complete search history.

(56) References Cited

U.S. PATENT DOCUMENTS

| | | | | |
|---|---|---|---|---|
| 10,511,592 B1* | 12/2019 | Phruksawan | ......... | H04L 63/166 |
| 10,587,413 B1* | 3/2020 | Todd | ......... | H04L 9/50 |
| 10,652,241 B1* | 5/2020 | Bendersky | ............ | H04W 12/30 |
| 10,764,752 B1* | 9/2020 | Avetisov | ............... | H04W 12/08 |
| 10,855,758 B1* | 12/2020 | O'Connell | ......... | H04L 67/1095 |
| 10,938,569 B2* | 3/2021 | Yang | ..................... | H04L 9/3271 |
| 11,030,299 B1* | 6/2021 | Ilincic | ................. | H04L 63/0853 |
| 11,100,548 B1* | 8/2021 | Gray | ..................... | H04L 63/083 |
| 11,233,647 B1* | 1/2022 | Fontaine | ............... | H04L 9/3215 |
| 11,818,265 B2* | 11/2023 | Ebrahimi | ............. | H04L 9/3239 |

(Continued)

*Primary Examiner* — Darren B Schwartz
(74) *Attorney, Agent, or Firm* — Leydig, Voit & Mayer, Ltd.

(57) ABSTRACT

In some instances, a method for verifying communication paths is provided. The method comprises: obtaining, from a first user device, a request to access content associated with a relying party system, wherein the request indicates user credentials and a first session identifier (ID); obtaining one or more quick response (QR) codes and a second session ID associated with a first QR code of the one or more QR codes, wherein the relying party system generates and provides the first QR code to the first user device; and verifying the first session ID and the second session ID, wherein the relying party system grants the first user device access to the requested content based on the verification.

20 Claims, 5 Drawing Sheets

(56) References Cited

U.S. PATENT DOCUMENTS

2016/0269181 A1* 9/2016 Hon ..................... H04L 9/3226
2018/0048652 A1* 2/2018 Leach ................ G06Q 20/3276
2020/0092272 A1* 3/2020 Eisen .................. H04L 63/0869

* cited by examiner

SYSTEMS AND METHODS FOR VERIFYING OR ENSURING COMMUNICATION PATHS

CROSS-REFERENCE TO RELATED APPLICATIONS

This patent application claims the benefit of U.S. Provisional Patent Application No. 63/154,484, filed Feb. 26, 2021, which is incorporated by reference herein in its entirety.

BACKGROUND

User credentials are more at risk of being stolen than ever before and when they are stolen, it may create serious hardships for the user. One primary way for a bad actor such as an unauthorized computing device to steal a user's credentials is by initiating a phishing attack. For instance, the bad actor may initiate man in the middle (MITM) attacks by situating themselves between the user (e.g., a user device) and a relying party (e.g., a relying party server) that is hosting an application and/or service. Both the user and the relying party may believe that they are speaking to each other; however, in reality, they may both be providing information, including sensitive information such as user passwords and/or other identifying information associated with the user, to the bad actor. In other words, a user may accidentally sign into a phishing website (e.g., the bad actor) thinking it is a relying party's website. The user may provide the user's login credentials (e.g., a password and user identifier (ID)) to the phishing website. In turn, the phishing website may assume the identity of the user and use the user's login credentials to login into the intended relying party's website and gain sensitive information about the user. Accordingly, there remains a technical need to prevent bad actors from accessing sensitive information associated with the user.

SUMMARY

In some examples, the present application provides a method and system to verify communication paths using session identifiers and quick response (QR) codes. By verifying the communication paths using session identifiers and QR codes, the present application may prevent bad actors such as unauthorized computing devices from obtaining user credentials and/or logging onto the relying party server using the user credentials. In particular, the present application may use a server such as a mailbox server to facilitate communication between user devices and the relying party as well as to prevent phishing attacks from succeeding. For example, the mailbox server may receive user credentials and a session ID from a first user device (e.g., a computing device) and may forward it to a relying party server. The relying party server may generate a quick response (QR) code that may be displayed on the first user device. A second user device may scan the generated QR code and provide the generated QR code along with a session ID to the mailbox server. The mailbox server may verify the session ID associated with the user credentials and the session ID associated with the QR code match. For instance, the mailbox server may forward the QR code and the associated session ID to the relying party server. The relying party server may determine whether the session ID associated with the QR code matches the session ID associated with the user credentials, which was received earlier. The relying party server may grant access to the requested content based on these session IDs matching. Additionally, and/or alternatively, the first user device may generate a second QR code and the second user device may scan both QR codes (e.g., the generated second QR code as well as the first QR code from the relying party). Based on these two QR codes as well as their session IDs matching, the relying party server may grant access to the requested content.

In one aspect, a method is provided. The method comprises: obtaining, from a first user device, a request to access content associated with a relying party system, wherein the request indicates user credentials and a first session identifier (ID); obtaining one or more quick response (QR) codes and a second session ID associated with a first QR code of the one or more QR codes, wherein the relying party system generates and provides the first QR code to the first user device; and verifying the first session ID and the second session ID, wherein the relying party system grants the first user device access to the requested content based on the verification.

In some instances, the first QR code comprises metadata indicating a digital address associated with the relying party system, obtaining the one or more QR codes and the second session ID comprises receiving, by the relying party system, the first QR code and the second session ID from a second user device via a mailbox system, and verifying the first session ID and the second session ID comprises determining, by the relying party system, whether the first session ID matches the second session ID.

In some examples, the first user device, the mailbox system, and the relying party system are part of a trusted decentralized system, wherein the trusted decentralized system is an identity blockchain.

In some variations, the first QR code is a designer QR code that indicates a digital address associated with a mailbox system and indicates that the first QR code is secure.

In some instances, obtaining the one or more QR codes and the second session ID comprises receiving, by a mailbox system, the first QR code and the second session ID, and wherein the method further comprises: forwarding, by the mailbox system, the first session ID to the relying party system; and forwarding, by the mailbox system, the second session ID and the first QR code to the relying party system, wherein verifying the first session ID and the second session ID comprises: comparing, by the relying party system, the first session ID with the second session ID; and granting the first user device access to the requested content based on the comparison.

In some examples, the method further comprises: scanning, by a second user device, the first QR code displayed on the first user device; determining, by the second user device and based on scanning the first QR code, the second session ID and metadata indicating a digital address associated with the relying party system or the mailbox system; and providing, by the second user device, the scanned first QR code and the second session ID to the mailbox system, wherein receiving the first QR code and the second session ID comprises receiving, by the mailbox system, the first QR code and the second session ID from the second user device.

In some variations, obtaining the one or more QR codes and the second session ID comprises: scanning, by a second user device, the first QR code generated by the relying party system; and scanning, by the second user device, a second QR code associated with the second session ID and generated by the first user device, wherein verifying the first session ID and the second session ID is based on the scanned first QR code and the scanned second QR code.

In some instances, obtaining the one or more QR codes and the second session ID further comprises: determining, by the second user device, the first session ID based on scanning the first QR code; and determining, by the second user device, the second session ID based on scanning the second QR code, and wherein verifying the first session ID and the second session ID comprises providing, by the second user device, verification information indicating that the first user device is authorized to access the content on the relying party system based on comparing the first session ID and the second session ID, wherein the relying party system grants the first user device access to the requested content based on the verification information.

In some examples, the second session ID is embedded into the second QR code generated by the first user device.

In some variations, determining the second session ID comprises: determining a digital address associated with the relying party system based on scanning the second QR code; providing a request for a session ID to the relying party system; and obtaining the second session ID from the relying party system based on the request.

In some instances, verifying the first session ID and the second session ID comprises providing, by a mailbox system and to the relying party system, verification information indicating that the first user device is authorized to access the content on the relying party system based on comparing the first session ID and the second session ID, wherein the relying party system grants the first user device access to the requested content based on the verification information.

In some examples, the method further comprises: receiving, by the mailbox system, the scanned first QR code and the scanned second QR code from the second user device; and determining, by the mailbox system, the first session ID and the second session ID based on the scanned first QR code and the scanned second QR code, and wherein verifying the first session ID and the second session ID further comprises comparing, by the mailbox system, the first session ID with the second session ID.

In another aspect, a system is provided. The system comprises a first user device, a second user device, and a relying party system. The first user device is configured to: provide, to a relying party system via a mailbox system, a request to access content associated with the relying party system, wherein the request indicates user credentials and a first session identifier (ID); and display a quick response (QR) code generated by the relying party system. The second user device is configured to: scan the QR code displayed on the first user device; and provide the scanned QR code and a second session ID associated with the QR code to the relying party system via the mailbox system. The relying party system is configured to: generate the QR code based on the request to access the content; compare the first session ID and the second session ID; and grant access to the first user device for the requested content based on the comparison.

In some instances, the system further comprises a mailbox system configured to: receive the request from the first user device; provide the request to the relying party system; receive the scanned QR code and the second session ID from the second user device; and provide the scanned QR code and the second session ID to the relying party system.

In some examples, the first user device, the mailbox system, and the relying party system are part of a trusted decentralized system, wherein the trusted decentralized system is an identity blockchain.

In some variations, the QR code comprises metadata indicating a digital address associated with the relying party system.

In yet another aspect, a system is provided. The system comprises a first user device, a second user device, and a relying party system. The first user device is configured to: provide, to a relying party system via a mailbox system, a request to access content associated with the relying party system, wherein the request indicates user credentials and a first session identifier (ID); display a first quick response (QR) code generated by the relying party system; generate a second QR code; and display the second QR code. The second user device is configured to: scan the first QR code and the second QR code displayed on the first user device; determine the first session ID from the first QR code; determine a second session ID from the second QR code; compare the first session ID and the second session ID; and provide, to the relying party system via the mailbox system, verification information indicating that the first user device is authorized to access the content on the relying party system based on the comparison. The relying party system is configured to: receive the verification information from the second user device; and grant access to the first user device for the requested content based on the verification information.

In some instances, the second session ID is embedded into the second QR code generated by the first user device.

In some examples, determining the second session ID comprises: determining a digital address associated with the relying party system based on scanning the second QR code; providing a request for a session ID to the relying party system; and obtaining the second session ID from the relying party system based on the request.

In some variations, the first user device, the mailbox system, and the relying party system are part of a trusted decentralized system, wherein the trusted decentralized system is an identity blockchain.

All examples and features mentioned herein may be combined in any technically possible way.

BRIEF DESCRIPTION OF THE DRAWINGS

The subject technology will be described in even greater detail below based on the exemplary figures, but is not limited to the examples. All features described and/or illustrated herein can be used alone or combined in different combinations. The features and advantages of various examples will become apparent by reading the following detailed description with reference to the attached drawings which illustrate the following.

DETAILED DESCRIPTION

Examples of the presented application will now be described more fully hereinafter with reference to the accompanying FIGs., in which some, but not all, examples of the application are shown. Indeed, the application may be exemplified in different forms and should not be construed as limited to the examples set forth herein; rather, these examples are provided so that the application will satisfy applicable legal requirements. Where possible, any terms expressed in the singular form herein are meant to also include the plural form and vice versa, unless explicitly stated otherwise. Also, as used herein, the term "a" and/or "an" shall mean "one or more" even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on".

Figure 1:
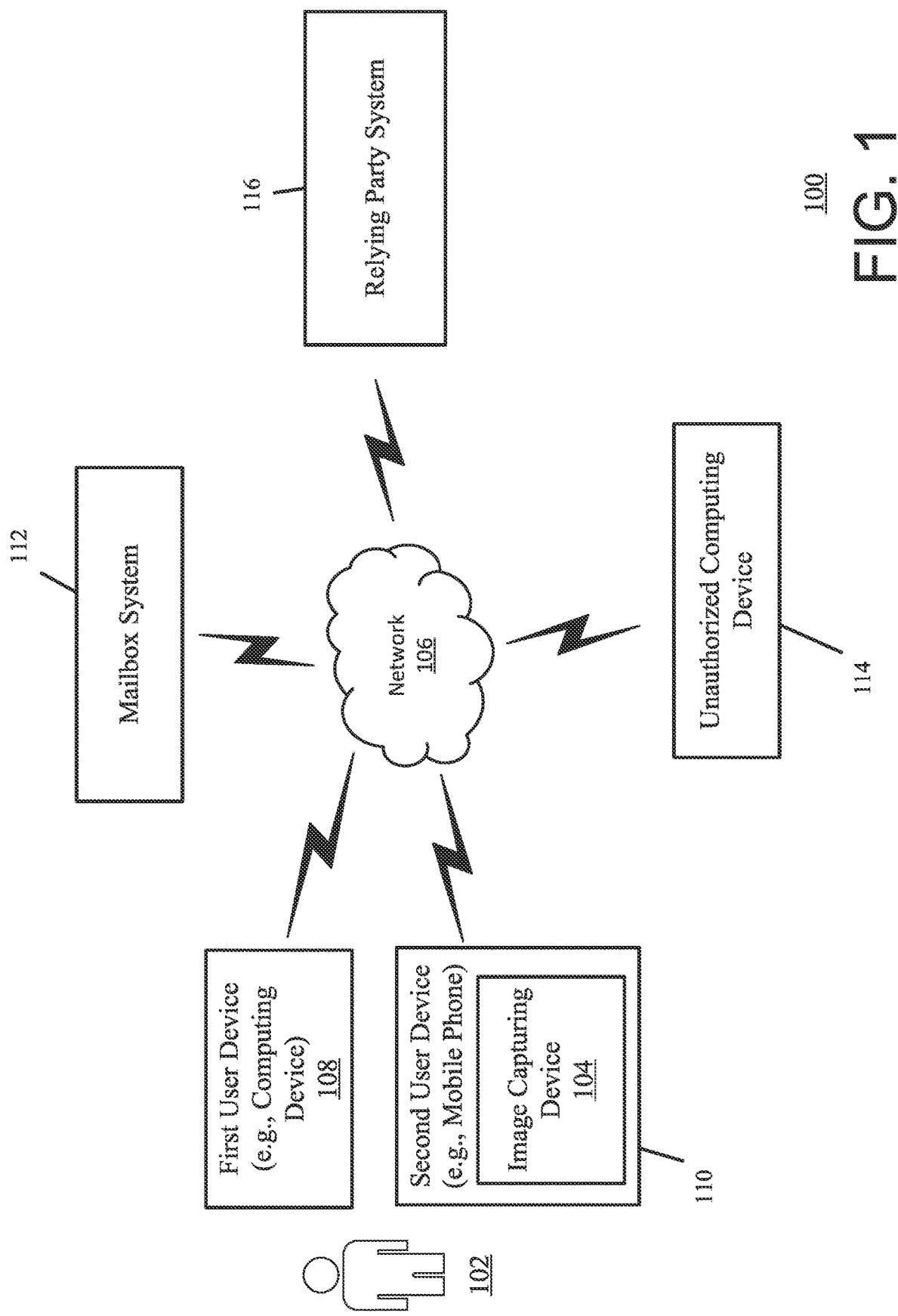
FIG. 1 is a simplified block diagram depicting an exemplary computing environment in accordance with one or more examples of the present application.

Systems, methods, and computer program products are herein disclosed that provide for verifying communication paths between a user device and a relying party using QR codes and session IDs. FIG. 1 is a simplified block diagram depicting an exemplary environment in accordance with an example of the present application. The environment 100 includes a user 102, a first user device 108 (e.g., a computing device), a second user device 110 (e.g., a mobile device), a network 106, a mailbox system 112 (e.g., mailbox server), an unauthorized computing device 114, and a relying party system 116 (e.g., relying party server). The second user device 110 may include an image capturing device 104. Although the entities within environment 100 may be described below and/or depicted in the FIGs. as being singular entities, it will be appreciated that the entities and functionalities discussed herein may be implemented by and/or include one or more entities.

The entities within the environment 100 such as first user device 108, the second user device 110, the mailbox system 112, the unauthorized computing device 114, and/or the relying party system 116 may be in communication with other devices and/or systems within the environment 100 via the network 106. The network 106 may be a global area network (GAN) such as the Internet, a wide area network (WAN), a local area network (LAN), or any other type of network or combination of networks. The network 106 may provide a wireline, wireless, or a combination of wireline and wireless communication between the entities within the environment 100.

User 102 may operate, own, and/or otherwise be associated with the first user device 108 and/or the second user device 110. For instance, the user 102 may be located in a particular location such as the user's home, the user's workplace (e.g., office building), an external residence (e.g., a friend's or acquaintance's home), or another location (e.g., a local coffee place or library). At this location, the user 102 may use the first user device 108 (e.g., a computing device) to perform tasks such as attempting to and accessing content from a website or from an application (e.g., a web page and/or application hosted and/or managed by a server such as the relying party system 116). In some instances, a website or application may request log-in information such as user credentials (e.g., user ID and password) and/or additional information (e.g., payment information) in order to access to the content on the website or application. For example, the user 102 may seek to access content on a web page (e.g., a first domain name) and enter this domain name into a web browser operating on the first user device 108. The server hosting the web page (e.g., the relying party system 116) may request for the user 102 to input their user credentials to verify that the user 102 is in fact the user 102.

However, a bad actor such as "man in the middle" (MITM) may initiate a phishing attack and/or another type of fraudulent interference in order to obtain the credentials and/or other sensitive information associated with the user 102 and log into the web page of the relying party system 116 using the obtained user credentials. A phishing attack may be a fraudulent attempt to obtain sensitive information or data, such as user names, passwords, payment information, and/or other type of information associated with the user 102 by impersonating itself as a trustworthy entity in a digital communication. For example, the MITM (e.g., the unauthorized computing device 114) may situate themselves between the communication path of the first user device 108 and the relying party system 116. Both the first user device 108 and the relying party system 116 assume that they are communicating with each other, but in actuality, they are both communicating with the MITM. As such, using the first user device 108, the user 102 may intend to provide the user credentials and/or other sensitive information to the relying party system 116, but may in actuality be providing this information to the unauthorized computing device 114. For instance, in some examples, the user 102 may be under the assumption that they are providing their credentials to sign onto a web page hosted and/or managed by the relying party system 116 (e.g., the first domain name), but instead, the user 102 may actually sign onto a phishing site (e.g., a name similar to the first domain name, but with a minor change such as by replacing the "o" with "0") associated with the unauthorized computing device 114. The unauthorized computing device 114 may receive the user credentials and use these credentials (e.g., user ID and password) to log onto the relying party system 116. Afterwards, the unauthorized computing device 114 may gain access to sensitive information or content about the user 102.

In some variations, to prevent these attacks, the relying party system 116 may prompt a response from the user 102 to ensure the user 102 is "live" (e.g., the user 102 is intending to sign-onto and access content on the relying party system 116). For instance, the relying party system 116 may provide a short message service (SMS) text message, a push notification, or a QR code for the user 102 to scan and authenticate to ensure the user 102 is "live". The second user device 110 may scan the generated QR code. Based on the user's 102 response, the relying party system 116 may authenticate and establish a session with user 102. A session may be a temporary and/or interactive information interchange between two or more communicating devices (e.g., between the relying party system 116 and the first user device 108). However, due to the MITM, the relying party system 116 might not be establishing the session with the first user device 108, but may actually be establishing the session with the unauthorized computing device 114.

In other words, unbeknownst to both the relying party system 116 and the first user device 108, an unauthorized entity such as the unauthorized computing device 114 may be facilitating the communication between the relying party system 116 and the first user device 108 such that after the first user device 108 provides their credentials and their response (e.g., the scanned QR code), it is the unauthorized computing device 114 that establishes the session with the relying party system 116. The problem described here may occur because the relying party system 116 is unable to confirm that the session ID that it sees is the same session ID that the user browser (e.g., the browser operating the first user device 108) sees. To put it another way, the first user device 108 may provide a session ID along with their credentials to log onto a web site and/or managed by the relying party system 116. A session ID may be a piece of data that is used in network communications to identify a session such as a series of related message exchanges. For instance, a session ID may be a unique number assigned to a specific user (e.g., the first user device 108 and/or the unauthorized computing device 114) for the duration of the user's visit. The session ID may be stored as a cookie, form field, or uniform resource locator (URL). However, due to the unauthorized computing device 114 initiating the phishing attack and being situated in between the first user device 108 and the relying party system 116, the unauthorized computing device 114 may receive the user's credentials as well as the session ID associated with credentials from the first user device 108 (e.g., the actual session ID). The unauthorized computing device 114 may provide their own session ID (e.g., an alternate session ID) along with the user's credentials to the relying party system 116. The relying party system 116 may inaccurately determine that the alternate session ID is actually from the first user device 108 (e.g., the alternate session ID is actual session ID) since it cannot confirm that the session ID sent to the relying party system 116 is the same session ID that was from the first user device 108. Therefore, in the absence of a session ID comparison, any out of band authentication step (e.g., the application from the user 102 and the web page or application hosted and/or managed on the relying party system 116) may be fooled by the MITM attack. As such, as will be explained in further detail below, in order to prevent phishing attacks and/or other fraudulent interferences by the unauthorized computing device 114, the environment 100 may use a mailbox system 112 to verify session IDs and ensure the relying party system 116 is not establishing a session with the unauthorized computing device 114, but rather with the first user device 108.

The first user device 108 is and/or includes, but is not limited to, a desktop, laptop, tablet, mobile device (e.g., smartphone device, or other mobile device), smart watch, an internet of things (IOT) device, or any other type of computing device that generally comprises one or more communication components, one or more processing components, and one or more memory components. The first user device 108 may be able to execute software applications. Additionally, and/or alternatively, the first user device 108 may be configured to operate a web browser to connect to a web page (e.g., the first domain name) and/or an application hosted and/or managed by a relying party system 116. For instance, the user 102 may use the first user device 108 to request access to content on the web page and/or provide user credentials to the relying party system 116 to gain access to the content.

The relying party system 116 is a computing system that hosts, operates, manages, and/or otherwise is associated with one or more web pages, web sites, and/or applications. The relying party system 116 includes and/or is implemented using one or more computing devices, computing platforms, cloud computing platforms, systems, servers, and/or other apparatuses capable of hosting the web pages, web sites, and/or applications. For example, the relying party system 116 may prompt the user 102 to provide proper credentials (e.g., user ID, password, and/or other information) in order to grant access to such information. Additionally, and/or alternatively, the relying party system 116 may generate and provide QR codes to the user 102 (e.g., the first user device 108) so that the relying party system 116 may verify the identity of the user 102. Based on verification of the user 102, the relying party system 116 may grant access to content and/or information associated with the user 102.

The second user device 110 is and/or includes, but is not limited to, a desktop, laptop, tablet, mobile device (e.g., smartphone device, or other mobile device), an internet of things (IOT) device, or any other type of computing device that generally comprises one or more communication components, one or more processing components, and one or more memory components. Furthermore, the second user device 110 includes an image capturing device 104 such as a camera. The image capturing device 104 can be any type of device that is capable of capturing an image such as an image of a QR code. For example, as mentioned above, the relying party system 116 may generate and provide a QR code to the first user device 108. The first user device 108 may display the QR code on a display device, which is part of the first user device 108 and/or a separate entity from the first user device 108. The second user device 110, which is in the same location as the first user device 108 as well as the user 102, captures the QR code displayed on the display device of the first user device 108. The second user device 110 may provide the QR code to the mailbox system 112 and/or the relying party system 116.

The unauthorized computing device 114 is and/or includes, but is not limited to, a desktop, laptop, tablet, mobile device (e.g., smartphone device, or other mobile device), computing platforms, cloud computing platforms, systems, servers, and/or other apparatuses capable of launching a phishing attack and/or other fraudulent attack. For instance, in some examples, the unauthorized computing device 114 may seek to gain access to sensitive information associated with the user 102 and/or may impersonate the user 102 to gain access to information from the relying party system 116.

The mailbox system 112 is a computing system that is configured to verify communication paths between a user device and a relying party using session identifiers and QR codes such that the unauthorized computing device 114 is prevented from accessing content on the relying party system 116 using the credentials of the user 102. The mailbox system 112 includes and/or is implemented using one or more computing devices, computing platforms, cloud computing platforms, systems, servers, and/or other apparatuses. For example, the mailbox system 112 may receive session IDs and/or one or more QR codes from the first user device 108 and/or the second user device 110. The mailbox system 112 may provide the session IDs to the relying party system 116 such that the relying party system 116 is able to verify that they are initiating a session with the user 102 as well as the first user device 108. Additionally, and/or alternatively, the first user device 108 may generate a QR code and the second user device 110 may scan both QR codes (e.g., the QR code from the relying party system 116 and the QR code generated by the first user device 108). The first user device 108 and/or the mailbox system 112 may use the QR codes and the session IDs to ensure that the relying party system 116 is communicating with the first user device 108.

In other words, the mailbox system 112 may provide an alternative communication path between the first user device 108 and the relying party system 116. This alternative communication path may bypass (e.g., not involve) the unauthorized computing device 114. By using this alternative communication path, the relying party system 116 and the first user device 108 may be ensured that they are actually communicating with each other rather than communicating with a MITM such as the unauthorized computing device 114. As such, the MITM is prevented from accessing content and/or information on the relying party system 116. This will be explained in further detail below.

In some variations, the mailbox system 112 may be implemented as engines, software functions, and/or applications. In other words, the functionalities of the mailbox system 112 may be implemented as software instructions stored in storage (e.g., memory) and executed by one or more processors.

In some instances, the mailbox system 112, the first user device 108, and/or the relying party system 116 are part of a trusted decentralized system. A decentralized system is an interconnected information system where no single entity is the sole authority. For instance, the decentralized system may take the form of a plurality of networked computers that are able to communicate with each other to perform one or more tasks and/or functionalities such as to verify user credentials and provide access to content on the relying party system 116. The mailbox system 112 may be part (e.g., one block) of an identity blockchain for accessing content on the relying party system 116. For instance, the mailbox system 112 may execute and/or run a digital address provider (DAP) for the web page and/or application hosted and/or managed by the relying party system 116. The DAP is an identity provider on the trusted decentralized system. In other words, the DAP may be on a secure ledger. In some instances, the trusted decentralized system is public. In other instances, the trusted decentralized system is private (e.g., it requires an invite to join the system).

It will be appreciated that the exemplary environment depicted in FIG. 1 is merely an example, and that the principles discussed herein may also be applicable to other situations—for example, including other types of institutions, organizations, devices, systems, and network configurations. For example, in some variations, the unauthorized computing device 114 might not be part of the environment 100 and may be part of a different environment that can launch a phishing attack on the user 102 and/or the first user device 108.

Figure 2:
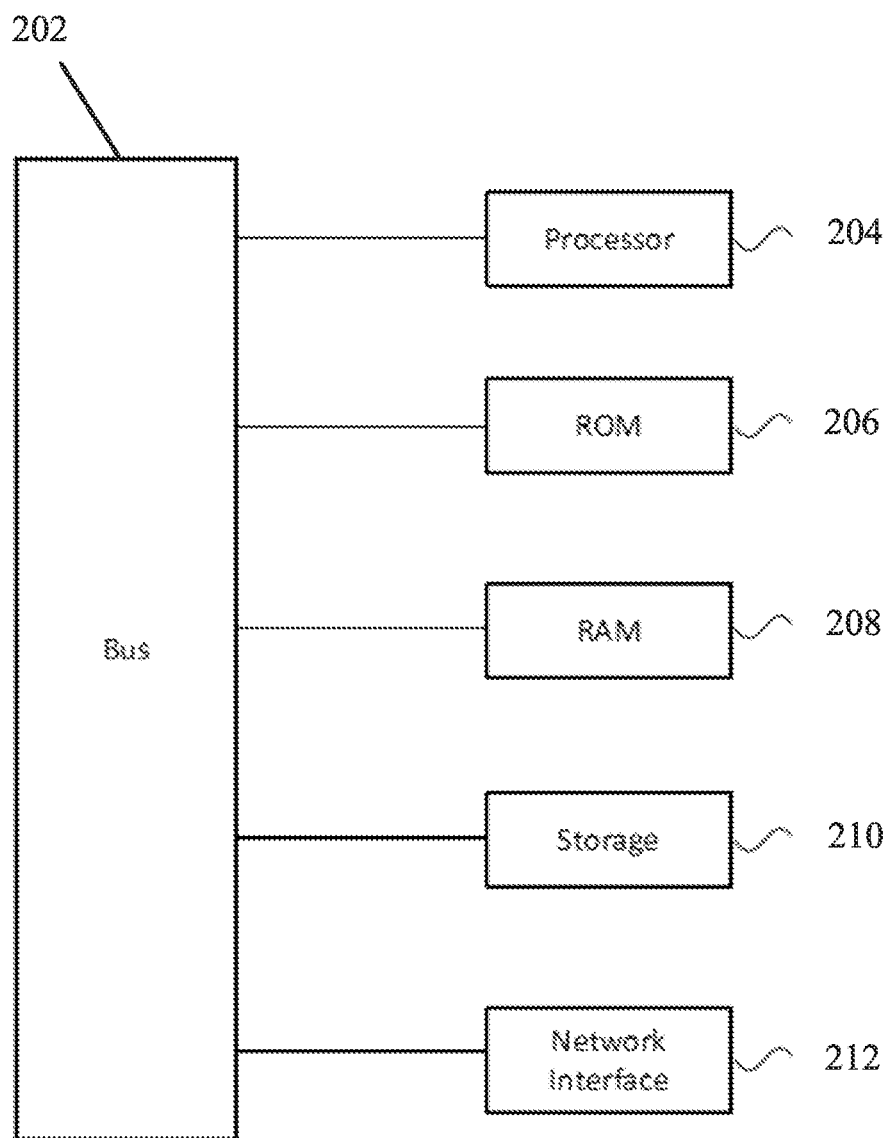
FIG. 2 is a simplified block diagram of one or more devices or systems within the exemplary environment of FIG. 1.

FIG. 2 is a block diagram of an exemplary system and/or device 200 (e.g., the first user device 108, the second user device 110, the mailbox system 112, and/or the relying party system 116) within the environment 100. The device/system 200 includes one or more processors 204, such as one or more CPUs, controller, and/or logic, that executes computer executable instructions for performing the functions, processes, and/or methods described herein. In some examples, the computer executable instructions are locally stored and accessed from a non-transitory computer readable medium, such as storage 210, which may be a hard drive or flash drive. Read Only Memory (ROM) 206 includes computer executable instructions for initializing the processor 204, while the random-access memory (RAM) 208 is the main memory for loading and processing instructions executed by the processor 204. The network interface 212 may connect to a wired network or cellular network and to a local area network or wide area network, such as the network 106. The device/system 200 may also include a bus 202 that connects the processor 204, ROM 206, RAM 208, storage 210, and/or the network interface 212. The components within the device/system 200 may use the bus 202 to communicate with each other. The components within the device/system 200 are merely exemplary and might not be inclusive of every component, server, device, computing platform, and/or computing apparatus within the device/system 200. For example, the second user device 110 may include some of the components within the device/system 200 and may also include additional and/or alternative components (e.g., the image capturing device 104). Additionally, and/or alternatively, the device/system 200 may further include components that might not be included within every entity of environment 100.

Figure 3:
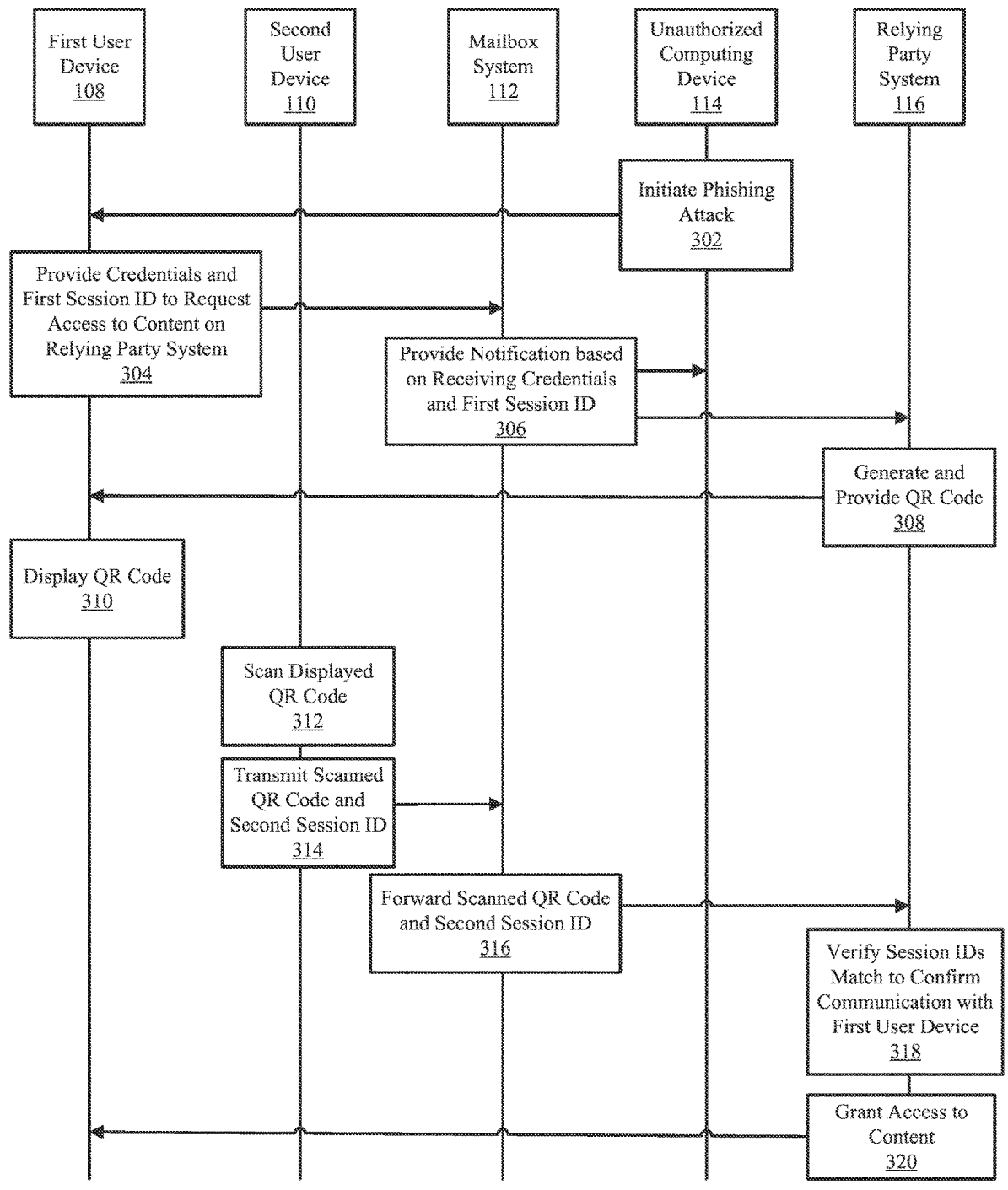
FIG. 3 is an exemplary event sequence for verifying communication paths between a user device and a relying party using session IDs and one or more QR codes in accordance with one or more examples of the present application.

FIG. 3 shows an exemplary event sequence 300 for verifying communication paths between a user device and a relying party using session IDs and one or more QR codes in accordance with one or more examples of the present application. However, the event sequence 300 is merely an example and other types of event sequences are contemplated herein including by performing any of the following blocks in any suitable order.

At block 302, the unauthorized computing device 114 initiates a phishing attack (and/or another type of fraudulent attack/interference) on the first user device 108 and/or the user 102. For example, as mentioned above, the user 102 may be at a first location (e.g., their own home) and may seek to access content hosted and/or managed on the relying party system 116. The unauthorized computing device 114 may initiate a phishing attack such that the unauthorized computing device 114 is impersonating itself as a trustworthy entity to the user 102. For example, the content hosted and/or managed on the relying party system 116 may be at a first domain name whereas the unauthorized computing device 114 is impersonating itself using a domain name that is similar to, but slightly different from, the first domain name (e.g., a domain name that replaces "o" with "0"). The impersonated or fake web page of the unauthorized computing device 114 may look similar to the legitimate web page (e.g., the web page hosted and/or managed by the relying party system 116). As such, the user 102, using the first user device 108, may be unaware that their web browser is on the web page associated with the unauthorized computing device's 114 rather than the web page of the relying party system 116. The unauthorized computing device 114 may provide a request for the user's credentials such as a user ID and a password.

In some instances, the unauthorized computing device 114 and/or another computing device may provide a notification or message (e.g., email spoofing, instant messaging, text messaging, and so on) in order to direct the user 102 to the impersonated web page. For instance, to initiate a phishing attack, the unauthorized computing device 114 may provide an email with a link to the user 102. The user 102, thinking that the email/link is associated with the relying party system 116, may use the first computing device 108 to click on the link, which directs a browser operating on the first computing device 108 to the impersonated web page. The impersonated web page displayed on the browser of the first computing device 108 may prompt the user 102 for credentials.

At block 304, the first user device 108 provides credentials and a first session ID to request access to content on the relying party system 116. The first user device 108 may provide the credentials (e.g., user ID and/or password) and the first session ID to the mailbox system 112. The first user device 108 may generate the first session ID, and use the first session ID for requesting access to content on the relying party system 116. In some instances, the relying party system 116, the first user device 108, and the mailbox system 112 are part of a trusted decentralized system such as an identity blockchain. As such, each device within the blockchain may have information indicating the next device in the blockchain. Therefore, the relying party system 116, the first user device 108, and the mailbox system 112 may be part of the blockchain and the mailbox system 112 may be an intermediate device between the first user device 108 and the relying party system 116. The first user device 108 may provide information (e.g., the credentials and the first session ID) to the next device in the blockchain. In some instances, the next device in the blockchain is the mailbox system 112. In other instances, the next device is another device in the blockchain, which continuously passes the information from the first user device 108 to the next device in the blockchain until the next device is the mailbox system 112.

At block 306, based on receiving the credentials and first session ID from the first user device 108, the mailbox system 112 provides a notification to the relying party system 116 and/or the unauthorized computing device 114. For example, the notification may indicate that the mailbox system 112 has received the user credentials and/or the first session ID. The mailbox system 112 may provide the notification to both the unauthorized computing device 114 and the relying party system 116. Based on receiving the notification, the relying party system 116 may retrieve the user credentials and/or the first session ID from the mailbox system 112. In some instances, the relying party system 116 may be associated with a unique digital address and/or other type of identifier that the mailbox system 112 is able to validate using a public key infrastructure (PKI). For example, rather than providing the user credentials and/or the first session ID to both the unauthorized computing device 114 and the relying party system 116, the mailbox system 112 provides a notification instead. Because the relying party system 116 and the mailbox system 112 share a PKI and based on the notification, the mailbox system 112 may be able to authenticate the relying party system 116 using the PKI. Based on the authentication, the mailbox system 112 authorizes the relying party system 116 to retrieve the first session ID and the user credentials from the mailbox system 112.

At block 308, the relying party system 116 generates and provides a QR code to the first user device 108. For instance, when a user 102 seeks to log on to the web page hosted, managed by, and/or otherwise related to the relying party system 116 through a browser, the relying party system 116 encodes its digital address with an obfuscated session ID that the relying party system 116 sees in the login. The relying party system 116 may generate and provide a QR code to the first user device 108 based on receiving the information (e.g., the first session ID and the user credentials) from the mailbox system 112. In some variations, when providing the credentials at block 304, the first user device 108 may request the QR code from the relying party system 116. In some examples, the relying party system 116 may further receive credentials and/or an alternate session ID from the unauthorized computing device 114. For example, as mentioned previously, the unauthorized computing device 114 may launch a phishing attack and may provide an alternate session ID to the relying party system 116. The relying party system 116 may be unable to determine which log-in request (e.g., from the first user device 108 via mailbox system 112 or from the unauthorized computing device 114) is authentic and which log-in request is the phishing attack (e.g., from the unauthorized computing device 114). As such, the relying party system 116 may use one or more QR codes and a second session ID to determine whether to grant access to the unauthorized computing device 114 or the first user device 108. Blocks 310-320 will be used to describe the authentication process using the QR codes and the second session ID.

In some instances, the relying party system 116 may generate a QR code with metadata (e.g., a digital address associated with the relying party system 116) and/or a designer QR code. The designer QR code might not be a "regular" QR code but may include information that provides an indication that the QR code is secure and/or includes information indicating a digital address associated with the mailbox system 112. The first user device 108 may use its own private key or another type of encryption/decryption method to parse and determine the relevant information from the QR code.

At block 310, the first user device 108 displays the QR code that was generated by and/or received from the relying party system 116. In some variations, the first user device 108 may be a computing device that includes a display device and may use the display device to display the QR code. In some examples, the first user device 108 may cause display of the QR code on a separate device/entity. Additionally, and/or alternatively, the first user device 108 may further display and/or otherwise indicate the session ID (e.g., first session ID) that it used in its initial communication in block 304.

At block 312, the second user device 110 scans the displayed QR code. For instance, the second user device 110 includes an image capturing device 104. The image capturing device 104 captures (e.g., scans) the QR code displayed on the first user device 108 and/or another device. In some instances, the QR code includes metadata such as a digital address associated with the relying party system 116. The second user device 110 may determine the address of the mailbox system 112 and/or another identifier associated with the mailbox system 112 based on the QR code and/or the metadata associated with the QR code. In some examples, the second user device 110 may determine a session ID (e.g., a second session ID) based on scanning the displayed QR code. For example, as mentioned earlier, the first user device 108 may display and/or otherwise indicate the session ID that it used in its initial communication with the relying party system 116. The first user device 108 may display and/or indicate this session ID with the QR code. The second user device 110 may determine a session ID (e.g., a second session ID) associated with the QR code based on scanning the displayed QR code.

At block 314, the second user device 110 transmits the scanned QR code and the second session ID to the mailbox system 112. For instance, based on the determined address and/or other identifier associated with the mailbox system 112 as well as obtaining the session ID associated with the QR code, the second user device 110 transmits the scanned QR code and a second session ID to the mailbox system 112. In some instances, the second user device 110 may perform a write operation to an account (e.g., the mailbox system 112) that is specified by the digital address based on the provided QR code. In other words, the second user device 110 uses a preset location to write its session information.

At block 316, the mailbox system 112 forwards the scanned QR code and the second session ID to the relying party system 116. For instance, upon the writing at the selected location, the mailbox system 112 (e.g., a trusted location) sends a notification to the relying party.

At block 318, the relying party system 116, having received both the scanned QR code and the two session IDs (e.g., a first session ID from block 304/306 and a second session ID associated with block 314 and 316), verifies the session IDs match to confirm communication with the first user device 108. In other words, the relying party system 116 may compare the first session ID associated with the user 102 providing their user credentials at block 304 with the second session ID associated with the scanned QR code at blocks 312 and 314. Based on whether the session IDs match, the relying party system 116 may determine whether to grant access to the content hosted and/or managed by the relying party system 116. Additionally, and/or alternatively, the relying party system 116 may compare the QR code with the generated QR code from block 308 to determine whether they match as well.

Based on the first and second session IDs matching, at block 320, the relying party system 116 grants access to content hosted and/or managed on the relying party system 116. For instance, the relying party system 116 establishes a session with the first user device 108. In other words, if the session IDs do not match, then the relying party system 116 may determine the scanning of the QR code was not being done by the second user device 110 (e.g., by the user 102) and denies access to the logon request. However, if the first and second session IDs match, the relying party system 116 accepts that the QR code was scanned by the second user device 110/the user 102. The relying party system 116 may provide a push notification to the first user device 108 and/or the second user device 110 to approve the logon request. Then, the first user device 108 and/or second user device 110 may log onto the web page, web site, and/or application that is hosted and/or managed by the relying party system 116.

To put it another way, a user device (e.g., the first user device 108) may use a session ID to communicate between itself and another entity such as the relying party system 116. An unauthorized computing device 114 might not be able to spoof and/or otherwise determine the session ID for the first user device 108. Accordingly, event sequence 300 uses a comparison between two session IDs to determine whether the user device associated with the user 102 is the user device communicating with the relying party system 116, and that there is not a MITM (e.g., the unauthorized computing device 114). For example, the first user device 108 provides credentials and first session ID (e.g., the session ID used by the first user device 108 for communicating with the relying party system 116) to the relying party system 116 via the mailbox system 112. Furthermore, the first user device 108 also displays a QR code from the relying party system 116. The second user device 110 may scan the QR code to determine a session ID (e.g., second session ID) associated with the QR code. The second user device 110 may provide the session ID and the scanned QR code to the relying party system 116 via the mailbox system 112. The relying party system 116 may compare the first and second session IDs and grant access to the requested content based on the comparison.

Figure 4:
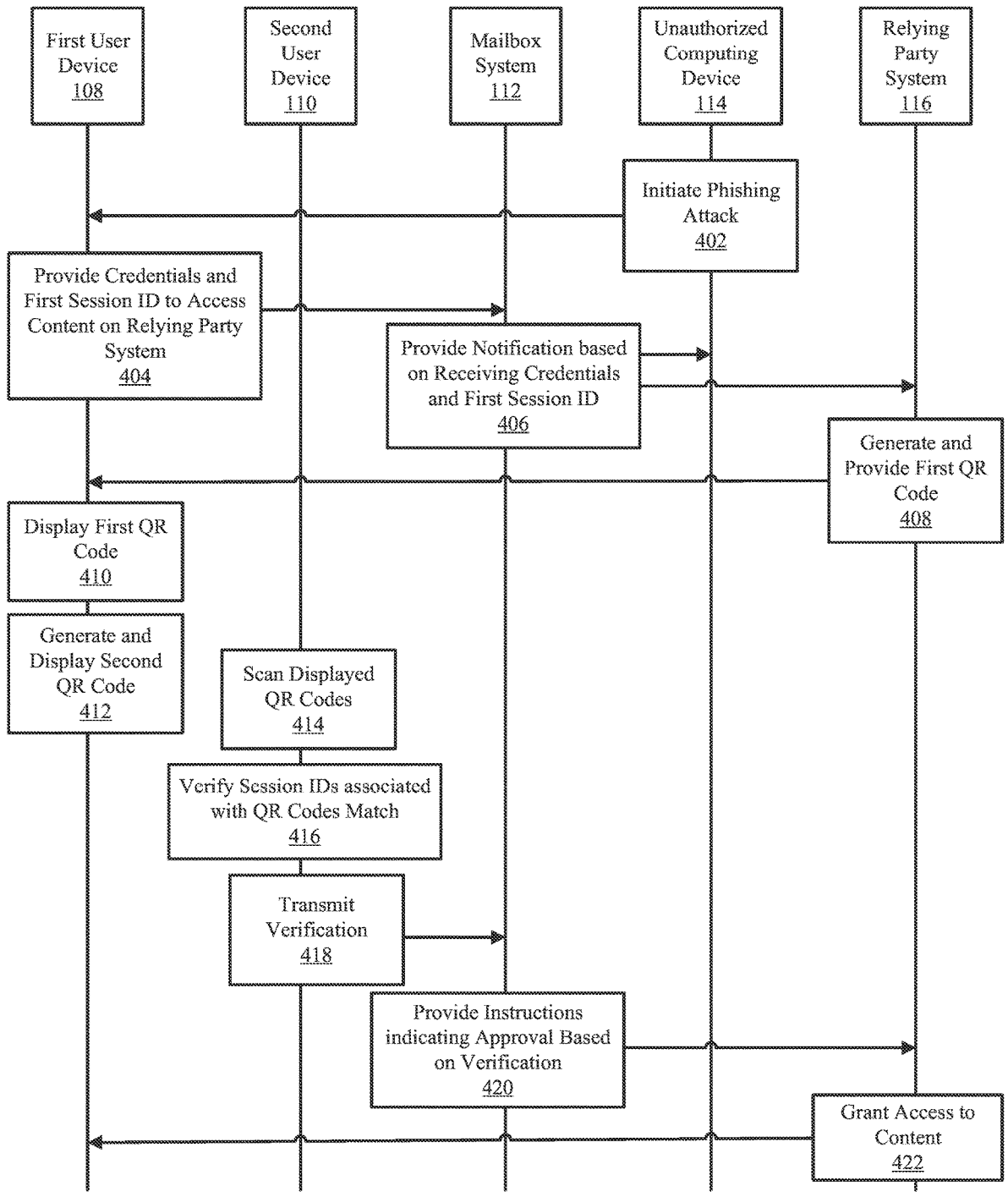
FIG. 4 is another exemplary event sequence for verifying communication paths between the user device and the relying party using session IDs and QR codes in accordance with one or more examples of the present application.

FIG. 4 shows another exemplary event sequence 400 for verifying communication paths between a user device and a relying party using session IDs and QR codes in accordance with one or more examples of the present application. However, the event sequence 400 is merely an example and other types of event sequences are contemplated herein including by performing any of the following blocks in any suitable order.

Certain blocks within event sequence 400 may be similar to certain blocks within event sequence 300. Further, in event sequence 400, rather than the relying party system 116 verifying the session IDs match in order to establish a session between itself and the first user device 108, another entity within environment 100 such as the first/second user device 108, 110 and/or the mailbox system 112 may verify the session IDs.

For instance, at block 402, the unauthorized computing device 114 initiates a phishing attack, which is described above in block 302.

At block 404, the first user device 108 provides credentials (e.g., user credentials) and a first session ID to access content on relying party system 116, which is described above in block 304. In some instances, the first user device 108, the mailbox system 112, and the relying party system 116 are members of a trusted decentralized system.

At block 406, based on receiving the credentials and first session ID, the mailbox system 112 provides a notification to the relying party system 116 and/or the unauthorized computing device 114, which is described above in block 306. After receiving the notification, the relying party system 116 may retrieve the user credentials and/or the first session ID from the mailbox system 112. In some examples, the relying party system 116 may have a unique digital address that may be validated through the use of a PM.

At block 408, the relying party system 116 generates and provides a first QR code to the first user device 108, which is described above in block 308. For example, in some variations, when a user 102 tries to log on to the relying party system 116 through a browser operating the on first user device 108, the relying party system 116 encodes its digital address with an obfuscated session ID it sees in the login it requests in the QR code. The relying party system 116 sends the QR code to the client running application (e.g., the first user device 108).

At block 410, the first user device 108 displays the first QR code from the relying party system 116, which is described above in block 310.

At block 412, the first user device 108 generates and displays a second QR code. The second QR code is different from the first QR code. For example, in response to receiving the first QR code from the relying party through a browser, the first user device 108 computes the session ID that is associated with the first QR code and generates a dynamic QR code (e.g., a second QR code). The dynamic QR code may be generated by a browser operating on the first user device 108. The first user device 108 displays the second QR code along with the first QR code (e.g., the QR code from the relying party system 116). In some instances, the first user device 108 displays the second QR code on a same display screen as the first QR code. In other instances, the first user device 108 initially displays the first QR code, and then after the second user device 110 scans the first QR code, the first user device 108 displays the second QR code.

At block 414, the second user device 110 scans the display QR codes. For example, the second user device 110 may scan the first QR code, which was received by the first user device 108 from the relying party system 116. As mentioned above, the second user device 110 may determine the first session ID based on scanning the first QR code. Further, the second user device 110 may scan the second QR code that was generated by the first user device 108. In some instances, the second user device 110 may determine a second session ID based on directly scanning the second QR code displayed on the first user device 108 (e.g., the first user device 108 may embed the session ID that is used for communicating between itself and the relying party system 116 within the second QR code). In other instances, the second user device 110 may communicate with another entity such as the relying party system 116 to obtain a second session ID using the second QR code. For example, the second user device 110 may determine the relying party system 116 based on scanning the second QR code, and provide a request for a session ID to the relying party system 116. Based on the request, the relying party system 116 may provide the session ID used by the first user device 108 to previously communicate with the relying party system 116.

At block 416, the second user device 110 may verify the session IDs associated with the QR codes to ensure they match. For example, the second user device 110 (e.g., the mobile application) may consume the two QR codes as displayed on the screen of the first user device 108. The first QR code may be associated with the digital address of the relying party system 116 and the session ID (e.g., first session ID) that the relying party system 116 sees. The second QR code is generated by the browser of the first user device 108 and a second session ID may be determined using the second QR code (e.g., either directly by scanning the second QR code and/or via communication with another entity such as the relying party system 116). The second user device 110 may validate the two session IDs and ensure they are the same.

At block 418, the second user device 110 transmits a verification to the mailbox system 112. For instance, based on the two session IDs matching (e.g., the session ID associated the initial communication between the first user device 108 to the relying party system 116, which prompted the relying party system 116 to generate the first QR code as well as the session ID associated with the second QR code that was generated at the first user device 108), the second user device 110 may transmit a verification to the mailbox system 112. The verification may be an approval request indicating the first user device 108 is authorized to access content hosted on and/or managed by the relying party system 116. If the two session IDs do not match, the second user device 110 may reject the authentication request.

At block 420, the mailbox system 112 provides instructions indicating the approval based on the verification. For instance, based on receiving the verification from the second user device 110, the mailbox system 112 provides instructions indicating the received verification to the relying party system 116.

At block 422, the relying party system 116 grants access to the content requested by the first user device 108. For instance, the relying party system 116 establishes a session with the first user device 108. The first user device 108 may be able to access content on the web page, web site, and/or application hosted by and/or managed by the relying party system 116.

In some variations, the mailbox system 112 may perform the verification of the session IDs rather than the second user device 110. In other words, the second user device 110 may provide both session IDs and/or the first and the second scanned QR codes to the mailbox system 112. The mailbox system 112 may determine whether these session IDs (e.g., the session ID associated with the first QR code from the relying party system 116 and the session ID associated with the second QR code generated by the first user device 108) match. If the QR codes match, the mailbox system 112 may transmit the verification indicating the match to the relying party system 116. Then, the relying party system 116 may grant access to the content.

Figure 5:
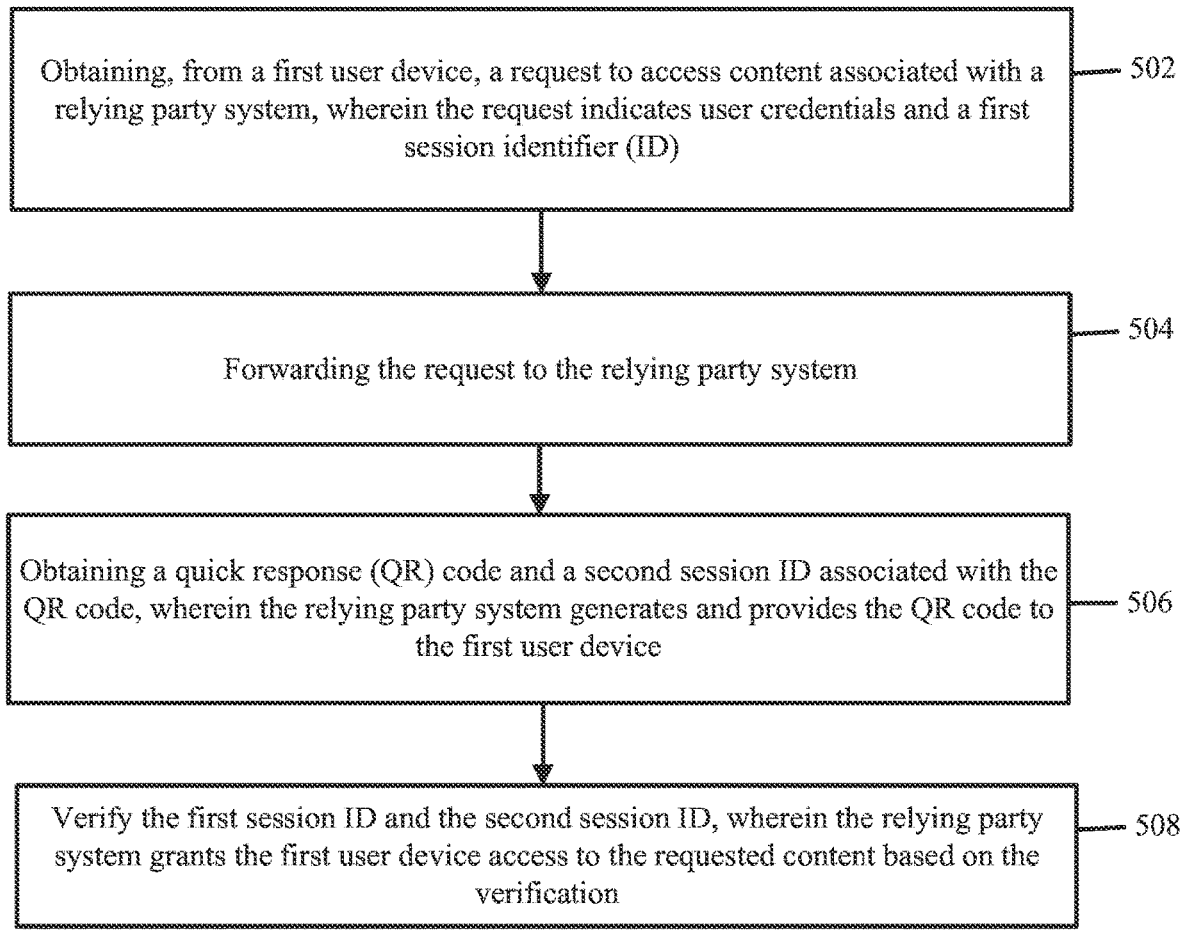
FIG. 5 is an exemplary process for verifying communication paths between the user device and the relying party using QR codes and session IDs in accordance with one or more examples of the present application.

FIG. 5 is an exemplary process 500 for verifying communication paths between the user device and the relying party using QR codes and session IDs in accordance with one or more examples of the present application. The process 500 may be performed by the entities of environment 100 shown in FIG. 1. However, it will be recognized that the process 500 may be performed in any suitable environment and that any of the following blocks may be performed in any suitable order.

In operation, at block 502, the mailbox system 112 obtains, from a first user device 108, a request to access content associated with a relying party system 116. The request may indicate the user credentials and a first session ID.

At block 504, the mailbox system 112 forwards the request to the relying party system 116.

At block 506, the mailbox system 112 and/or the second user device 110 obtains a scanned QR code and a session ID associated with the QR code. For instance, the mailbox system 112 may obtain the scanned QR code and session ID associated with the QR code from the second user device 110. The relying party system 116 generates and provides the QR code to the first user device 108. Additionally, and/or alternatively, the first user device 108 generates a second QR code. The second user device 110 scans and obtains the first QR code that is generated by the relying party system 116 as well as a second QR code that is generated by the first user device 108.

At block 508, the mailbox system 112, the relying party system 116, and/or the second user device 110 verifies the first session ID and the second session ID. The relying party system 116 grants the first user device 108 access to the requested content based on the verification. For instance, as described above, the mailbox system 112 may provide the first and second session IDs to the relying party system 116. The relying party system 116 may ensure these two session IDs match. Then, the relying party system 116 may grant access to the content.

Additionally, and/or alternatively, the mailbox system 112 may receive two QRs and each of the QR codes is associated with a session ID. For instance, the first QR code may be generated by the relying party system 116 and associated with the first session ID. The second QR code may be generated by the first user device 108 and associated with the second session ID. The mailbox system 112 may verify the two session IDs match and if so, may provide a verification to the relying party system 116. The relying party system 116 may grant access to the content based on the verification performed by the mailbox system 112. Additionally, and/or alternatively, a second user device 110 may scan the first and second QR codes. The second user device 110 may compare the session IDs associated with the two QR codes. Based on the two QR codes matching, the second user device 110 may provide a verification to the mailbox system 112. The mailbox system 112 may forward the verification to the relying party system 116. The relying party system 116 may grant access to the content based on receiving the verification.

A number of implementations have been described. Nevertheless, it will be understood that additional modifications may be made without departing from the scope of the inventive concepts described herein, and, accordingly, other examples are within the scope of the following claims. For example, it will be appreciated that the examples of the application described herein are merely exemplary. Variations of these examples may become apparent to those of ordinary skill in the art upon reading the foregoing description. The inventor expects skilled artisans to employ such variations as appropriate, and the inventor intends for the application to be practiced otherwise than as specifically described herein. Accordingly, this application includes all modifications and equivalents of the subject matter recited in the claims appended hereto as permitted by applicable law.

Moreover, any combination of the above-described elements in all possible variations thereof is encompassed by the application unless otherwise indicated herein or otherwise clearly contradicted by context.

It will further be appreciated by those of skill in the art that the execution of the various machine-implemented processes and steps described herein may occur via the computerized execution of processor-executable instructions stored on a non-transitory computer-readable medium, e.g., random access memory (RAM), read-only memory (ROM), programmable read-only memory (PROM), volatile, nonvolatile, or other electronic memory mechanism. Thus, for example, the operations described herein as being performed by computing devices and/or components thereof may be carried out by according to processor-executable instructions and/or installed applications corresponding to software, firmware, and/or computer hardware.

The use of the term "at least one" followed by a list of one or more items (for example, "at least one of A and B") is to be construed to mean one item selected from the listed items (A or B) or any combination of two or more of the listed items (A and B), unless otherwise indicated herein or clearly contradicted by context. The terms "comprising," "having," "including," and "containing" are to be construed as open-ended terms (i.e., meaning "including, but not limited to,") unless otherwise noted. Recitation of ranges of values herein are merely intended to serve as a shorthand method of referring individually to each separate value falling within the range, unless otherwise indicated herein, and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate the application and does not pose a limitation on the scope of the application unless otherwise claimed. No language in the specification should be construed as indicating any non-claimed element as essential to the practice of the application.

The invention claimed is:

1. A method, comprising:
based on a request from a first user device to access content associated with a relying party system, obtaining, by a second user device, a first quick response (QR) code and a second QR code, wherein the request indicates user credentials and a first session identifier (ID), wherein the relying party system generates and provides the first QR code to the first user device, and wherein the second QR code is a dynamic QR code that is generated based on the first session ID indicated by the first QR code;
verifying, based on the obtained first QR code and the obtained second QR code, the first session ID and a second session ID; and
granting the first user device access to the requested content based on the verification.

2. The method of claim 1, wherein the first QR code comprises metadata indicating a digital address associated with the relying party system.

3. The method of claim 1, wherein the first user device and the relying party system are part of a trusted decentralized system, wherein the trusted decentralized system is an identity blockchain.

4. The method of claim 1, wherein the first QR code is a designer QR code that indicates a digital address associated with a mailbox system and indicates that the first QR code is secure.

5. The method of claim 1, wherein obtaining the first QR code and the second QR code comprises:
scanning, by the second user device, the first QR code that is generated by the relying party system; and
scanning, by the second user device, the second QR code associated with the second session ID, wherein the second QR code is generated by the first user device,
wherein verifying the first session ID and the second session ID is based on the scanned first QR code and the scanned second QR code.

6. The method of claim 5, wherein obtaining the first QR code and the second QR code further comprises:
determining, by the second user device, the first session ID based on scanning the first QR code; and
determining, by the second user device, the second session ID based on scanning the second QR code, and
wherein verifying the first session ID and the second session ID comprises providing, by the second user device, verification information indicating that the first user device is authorized to access the content on the relying party system based on comparing the first session ID and the second session ID, wherein granting the first user device access to the requested content is based on the verification information.

7. The method of claim 6, wherein the second session ID is embedded into the second QR code generated by the first user device.

8. The method of claim 6, wherein determining the second session ID comprises:
determining a digital address associated with the relying party system based on scanning the second QR code;
providing a request for a session ID to the relying party system; and
obtaining the second session ID from the relying party system based on the request.

9. The method of claim 5, wherein verifying the first session ID and the second session ID comprises providing, by a mailbox system and to the relying party system, verification information indicating that the first user device is authorized to access the content on the relying party system based on comparing the first session ID and the second session ID, wherein granting the first user device access to the requested content is based on the verification information.

10. The method of claim 9, further comprising:
receiving, by the mailbox system, the scanned first QR code and the scanned second QR code from the second user device; and
determining, by the mailbox system, the first session ID and the second session ID based on the scanned first QR code and the scanned second QR code, and
wherein verifying the first session ID and the second session ID further comprises comparing, by the mailbox system, the first session ID with the second session ID.

11. A system, comprising:
a first user device configured to:
provide, to a relying party system via a mailbox system, a request to access content associated with the relying party system, wherein the request indicates user credentials and a first session identifier (ID);

display a first quick response (QR) code generated by the relying party system, wherein the first QR code indicates the first session ID;

generate a second QR code based on the first session ID indicated by the first QR code, wherein the second QR code is a dynamic QR code that is different from the first QR code; and display the second QR code;

a second user device configured to:

scan the first QR code and the second QR code displayed on the first user device;

determine the first session ID from the first QR code;

determine a second session ID from the second QR code;

compare the first session ID and the second session ID; and provide, to the relying party system via the mailbox system, verification information indicating that the first user device is authorized to access the content on the relying party system based on the comparison; and the relying party system configured to:

receive the verification information from the second user device; and grant access to the first user device for the requested content based on the verification information.

12. The system of claim 11, wherein the second session ID is embedded into the second QR code generated by the first user device.

13. The system of claim 11, wherein determining the second session ID comprises:

determining a digital address associated with the relying party system based on scanning the second QR code;

providing a request for a session ID to the relying party system; and obtaining the second session ID from the relying party system based on the request.

14. The system of claim 11, wherein the first user device, the mailbox system, and the relying party system are part of a trusted decentralized system, wherein the trusted decentralized system is an identity blockchain.

15. A system, comprising:

one or more processors; and a non-transitory computer-readable medium having processor-executable instructions stored thereon, wherein the processor-executable instructions, when executed by the one or more processors, facilitate:

based on a request from a first user device to access content associated with a relying party system, obtaining a first quick response (QR) code and a second QR code, wherein the request indicates user credentials and a first session identifier (ID), wherein the relying party system generates and provides the first QR code to the first user device, and wherein the second QR code is a dynamic QR code that is generated based on the first session ID indicated by the first QR code;

verifying, based on the obtained first QR code and the obtained second QR code, the first session ID and a second session ID; and granting the first user device access to the requested content based on the verification.

16. The system of claim 15, wherein the first QR code comprises metadata indicating a digital address associated with the relying party system.

17. The system of claim 15, wherein the first user device and the relying party system are part of a trusted decentralized system, wherein the trusted decentralized system is an identity blockchain.

18. The system of claim 15, wherein obtaining the first QR code and the second QR code comprises:

scanning the first QR code that is generated by the relying party system; and scanning the second QR code associated with the second session ID, wherein the second QR code is generated by the first user device, wherein verifying the first session ID and the second session ID is based on the scanned first QR code and the scanned second QR code.

19. The system of claim 18, wherein obtaining the first QR code and the second QR code further comprises:

determining the first session ID based on scanning the first QR code; and determining the second session ID based on scanning the second QR code, and wherein verifying the first session ID and the second session ID comprises providing verification information indicating that the first user device is authorized to access the content on the relying party system based on comparing the first session ID and the second session ID, wherein the relying party system grants the first user device access to the requested content based on the verification information.

20. The system of claim 18, wherein determining the second session ID comprises:

determining a digital address associated with the relying party system based on scanning the second QR code;

providing a request for a session ID to the relying party system; and obtaining the second session ID from the relying party system based on the request.

* * * * *